United States Patent
Hesse et al.

(10) Patent No.: US 12,142,976 B2
(45) Date of Patent: Nov. 12, 2024

(54) METHOD FOR JOINING COPPER HAIRPINS AND STATOR

(71) Applicant: TRUMPF Laser—und Systemtechnik GmbH, Ditzingen (DE)

(72) Inventors: Tim Hesse, Ditzingen (DE); Oliver Bocksrocker, Sachsenheim (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 677 days.

(21) Appl. No.: 17/430,831

(22) PCT Filed: Feb. 11, 2020

(86) PCT No.: PCT/EP2020/053427
§ 371 (c)(1),
(2) Date: Aug. 13, 2021

(87) PCT Pub. No.: WO2020/165142
PCT Pub. Date: Aug. 20, 2020

(65) Prior Publication Data
US 2022/0166296 A1 May 26, 2022

(30) Foreign Application Priority Data

Feb. 13, 2019 (DE) .......................... 102019103668.2

(51) Int. Cl.
*H02K 15/04* (2006.01)
*B23K 26/06* (2014.01)
(Continued)

(52) U.S. Cl.
CPC ..... *H02K 15/0421* (2013.01); *B23K 26/0626* (2013.01); *B23K 26/0732* (2013.01);
(Continued)

(58) Field of Classification Search
CPC ........... H02K 15/0421; H02K 15/0081; B23K 26/0626; B23K 26/0732; B23K 26/21;
(Continued)

(56) References Cited

U.S. PATENT DOCUMENTS 10,091,894 B2   10/2018   Liskow
10,312,777 B2 *  6/2019   Fröhlich .................. H02K 3/28
(Continued)

FOREIGN PATENT DOCUMENTS

CN  102427909 A   4/2012
CN  106041301 A   10/2016
(Continued)

OTHER PUBLICATIONS

Haubold et al.: "Laser welding of copper using a high power disc laser at green wavelenght", Procedia CIRP 74 (2018) pp. 446-449.
(Continued)

*Primary Examiner* — Robert G Bachner
(74) *Attorney, Agent, or Firm* — Laurence A. Greenberg; Werner H. Stemer; Ralph E. Locher

(57) ABSTRACT

A method for joining copper hairpins includes providing at least two ends to be joined to one another of the copper hairpins, and joining the copper hairpins. The copper hairpins are joined by laser beam welding with a machining beam having a wavelength of less than 1000 nm.

18 Claims, 1 Drawing Sheet

(51) Int. Cl.
  *B23K 26/073* (2006.01)
  *B23K 26/21* (2014.01)
  *B23K 26/322* (2014.01)
  *B23K 101/38* (2006.01)
  *B23K 103/12* (2006.01)
  *H02K 15/00* (2006.01)

(52) U.S. Cl.
  CPC ............ *B23K 26/21* (2015.10); *B23K 26/322* (2013.01); *H02K 15/0081* (2013.01); *B23K 2101/38* (2018.08); *B23K 2103/12* (2018.08)

(58) Field of Classification Search
  CPC .............. B23K 26/322; B23K 2101/38; B23K 2103/12; B23K 26/073
  See application file for complete search history.

(56) References Cited

U.S. PATENT DOCUMENTS

| | | | |
|---|---|---|---|
| 10,610,962 | B2 | 4/2020 | Kaiser |
| 10,835,992 | B2 | 11/2020 | Kaiser et al. |
| 11,065,718 | B2 | 7/2021 | Tateyama et al. |
| 2012/0055909 | A1 | 3/2012 | Miyake et al. |
| 2018/0036836 | A1* | 2/2018 | Nakamura ......... B23K 26/0736 |
| 2018/0088168 | A1* | 3/2018 | Dang ................... G01R 31/346 |
| 2018/0236605 | A1 | 8/2018 | Finuf et al. |
| 2019/0262942 | A1 | 8/2019 | Haug et al. |
| 2020/0067388 | A1 | 2/2020 | Zeadan et al. |

FOREIGN PATENT DOCUMENTS

| | | |
|---|---|---|
| CN | 106465552 A | 2/2017 |
| CN | 108136540 A | 6/2018 |
| CN | 109093249 A | 12/2018 |
| DE | 102014226710 A1 | 6/2016 |
| DE | 102016222357 A1 | 5/2018 |
| DE | 102016222385 A1 | 5/2018 |
| DE | 102017206545 A1 | 8/2018 |
| EP | 3088124 A1 | 11/2016 |
| EP | 3099445 A1 | 12/2016 |
| JP | 2006094600 A | 4/2006 |
| WO | 2015113811 A1 | 8/2015 |

OTHER PUBLICATIONS

Eva-Maria Dold et al.Qualitativ hochwertige Kupferschweissungen durch gruene Hochleistungsdauerstrichlaser [High quality copper welds using green high-performance continuous wave lasers], Metall, Nov. 1, 2018, (Nov. 1, 2018), pp. 457-459 https://www.kupferinstitut.de/wp-content/uploads/2019/11/457-FA-Dold.pdf [retrieved from the Internet on Jun. 24, 2020], XP055708270—English abstract.

* cited by examiner

METHOD FOR JOINING COPPER HAIRPINS AND STATOR

BACKGROUND OF THE INVENTION

Field of the Invention

The present invention relates to a method for joining copper hairpins, in particular for joining copper hairpins which are intended to form a stator winding of a stator for an electric motor.

For the formation of stators in electric motors, it is known to provide a stator cage which is formed from an insulating material and into which so-called hairpins composed of an electrically conductive material, preferably copper, are pushed, plugged or inserted for example by means of compressed air. The hairpins may for example be of clip-shaped or linear configuration and, after they have been introduced into the stator cage, are parallel to one another and are present substantially in an axial direction of the stator or of the electric motor in the stator cage. However, it is also possible that the hairpins are not oriented parallel to one another.

A multiplicity of such hairpins are introduced into the stator cage around the circumference of the stator cage, said hairpins initially having no mechanical and electrical connection to one another during assembly or manufacture.

After the hairpins have been introduced into the stator cage and after any forming and/or shortening and any pretreatment, for example paint stripping, the respective free ends of said hairpins are then preferably joined to one another in a pairwise manner, for example by welding or soldering, to form a complete stator winding. As a result of the joining, both a mechanical connection and an electrically conductive connection are established between the ends of the respective pairs of hairpins, such that the hairpins which were initially present in individual form after being introduced are now connected. However, it is also possible for more than two hairpins to be joined to one another by a machining process. The joining of the hairpins makes it possible to form a mechanically and electrically interconnected, continuous stator winding.

The use of hairpins instead of a continuous wire winding can for example offer advantages in the production of the respective stator, since the hairpins can simply be inserted or pushed linearly into the stator cage. It is also possible to introduce a plurality or all of the hairpins simultaneously, such that a lengthy winding operation is thus omitted.

The hairpins used also usually have a substantially square or rectangular cross section, such that in the case of a correspondingly close arrangement of the hairpins adjacent to one another in the stator cage, the fill factor with the conductive material of the hairpins, for example the copper, can be significantly improved compared with a formation by a conventional stator winding with a wire having a round cross section. Correspondingly, the efficiency of an electric motor can be improved on account of the increased fill factor and/or the material consumption for the formation of a stator winding can be reduced.

Irrespective of the actual cross-sectional geometry, hairpins usually have at least one cross-sectional area that is significantly larger than a wire configured for winding. This enables an increased flow of current compared with a wire. The increase in the performance of electric motors that can be achieved in this way is particularly advantageous in the case of electric motors for motor vehicles, since these have to meet very high performance requirements.

However, the formation of a conventional winding with a copper hairpin having a larger cross-sectional area and having, for example, a rectangular or square cross section is not possible due to the stresses that occur as a result of the dimensioning and geometry, such that the copper hairpins can be introduced into the stator cage only in the aforementioned, quasi-linear configuration.

Before the ends of the hairpins are joined to produce a continuous stator winding, a coating applied to the hairpins is usually removed in the region of the ends where the joining is intended to take place. This removal of the coating can be carried out for example in a mechanical, chemical or physical manner, for example by means of a laser.

Before the hairpins are joined, they can also be geometrically adapted and oriented for joining, for example shortened, formed and gathered together in pairs, wherein the gathering-together can be achieved for example by mechanically clamping the ends to be joined of the hairpins.

After the preparations have been completed, the respective ends to be joined to one another of the hairpins are then actually joined to one another, for example by laser beam welding with a machining beam in the near infrared (NIR), for example at a wavelength of 1030 nm. The known laser beam welding of the hairpins takes place in the form of deep welding with the formation of a vapor capillary.

When welding copper hairpins with known methods using machining beams at wavelengths of 1030 nm, the absorption of the energy of the machining beam in the material of the hairpin may vary from hairpin to hairpin due to changing surface properties, such that the energy introduced and the volume of material melted can fluctuate accordingly. Correspondingly, an irregular joining result may occur in the case of successive joining processes of several hairpin pairings. In other words, it may be an unstable process.

In addition, the energy absorption at wavelengths around 1030 nm in copper is relatively poor, since copper is highly reflective for these wavelengths. Deep welding with vapor capillary is thus necessary because the vapor capillary can significantly increase the energy absorption, although laser beam welding of copper with vapor capillary is accompanied by disadvantages such as for example the formation of spatter and ejections as well as the formation of process pores in the solidified melt.

SUMMARY OF THE INVENTION

Proceeding from the known prior art, it is an object of the present invention to specify a method for joining copper hairpins which leads to a more uniform joining result.

The object is achieved by a method for joining copper hairpins having the features as claimed. Advantageous developments emerge from the dependent claims, from the present description and from the attached figures.

Accordingly, a method for joining copper hairpins is proposed, comprising the provision of at least two ends to be joined to one another of copper hairpins, and the joining of the copper hairpins to be joined by laser beam welding with a machining beam having a wavelength of less than 1000 nm.

The use of a machining beam having a wavelength of less than 1000 nm has the effect that the degree of absorption of the machining beam in the copper material of the hairpins increases significantly compared with the previously used machining beams. In this way, the energy input into the copper hairpins to be joined to one another can be improved, such that lower fluctuations in absorption on account of different surface properties are correspondingly also achieved.

A more uniform absorption of the energy of the machining beam in the copper hairpins can thus be achieved. In this way, the joining process for joining the copper hairpins can be improved and made to be more stable, such that ultimately a more uniform joining result can be achieved.

For the laser beam welding of the copper hairpins to be joined, preference is given to using a green machining beam, for example a laser beam having a wavelength of 500 nm to 550 nm, particularly preferably having a wavelength of 510 nm to 520 nm, or a blue machining beam, for example a laser beam having a wavelength of 425 nm to 475 nm, particularly preferably having a wavelength of 440 nm to 450 nm.

Due to the improved absorption in the copper material in these wavelength ranges, the joining operation can correspondingly be carried out in a more controlled manner, such that a more uniform joining result can be achieved.

Whether a welding process is a heat conduction process or a deep welding process is largely dependent on the energy density or the intensity of the machining beam impinging on the copper hairpins to be joined to one another. Exceeding a so-called threshold intensity, from which the heat conduction process changes into a deep welding process, should ideally be avoided.

However, the use of high machining energies is also conceivable as long as the machining energy is distributed over a large area, for example in the case of hairpins which have an above-average-sized diameter. Owing to the large machining area, the achieved energy density or intensity of the machining beam is then preferably to be adjusted again such that the threshold intensity, from which the heat conduction process changes into a deep welding process, is not exceeded.

The laser welding of the copper hairpins with the machining beam in the proposed wavelength ranges is preferably carried out substantially by means of heat conduction welding. This makes the laser welding process more stable and more controllable, since the fluctuations in the energy input into the material to be melted that occur during the formation of vapor capillaries can be reduced or avoided.

The use of the aforementioned wavelengths for the machining beam makes it possible, on account of the increased absorption in the copper material, to correspondingly carry out a welding process which manages completely without formation of vapor capillaries or with the formation of only a small vapor capillary. A vapor capillary that may be formed then has only a low aspect ratio (depth/width). Correspondingly, heat conduction and heat conduction welding dominate in the proposed welding process and deep welding with vapor capillary does not occur or at least does not occur as the dominant welding process.

Due to the higher absorption of the machining beam in the material of the copper hairpins, it is also easier to keep the power of the machining beam at a level which favors heat conduction welding. In other words, high machining energy densities or intensities of the machining beam, which would lead to deep welding, can be dispensed with. Thus, small fluctuations in the energy input by means of the machining beam into the copper hairpins to be joined also do not lead to a breakdown of the welding process, such that the welding process proceeds in a more stable manner overall.

In this way, the formation of a vapor capillary during the welding process can also be dispensed with or the use thereof can be significantly reduced, since the degree of absorption of the machining beams at the proposed wavelengths in the copper material of the copper hairpins increases significantly.

In this case, the machining beam is preferably introduced onto an end face of the hairpins to be joined, that is to say in particular in a longitudinal direction of the hairpins to be joined to one another. Correspondingly, heat conduction takes place along the longitudinal direction or along the extent of the respective hairpins.

The machining beam is preferably adapted to the geometry of the hairpins to be joined to one another. Preferably, the machining beam impinges completely on end faces of the hairpins to be joined to one another.

Accordingly, the machining beam thus impinges on the total end face of the hairpins, such that heat conduction and thus melting can take place only in the remaining dimension, namely in the longitudinal direction of the copper hairpins.

In a preferred alternative, it is also possible for the machining beam to impinge only partially on the end faces of the hairpins to be joined to one another. In this case, it is for example possible that the machining beam does not impinge on the in a central region at all, such that the intensity of the machining beam in the central region is equal to 0. That region of the end face on which the machining beam impinges is correspondingly configured for example in the form of a frame or ring.

In a further preferred alternative, it is also possible for a machining beam having a first intensity in a first region and a second intensity in a second region to impinge on the end faces. In the first region and in the second region, it is alternatively or additionally also possible for the end faces to be impinged upon with different wavelengths of the machining beam. In other words, a higher intensity can be applied to the end faces for example in a first region, which is configured for example in the form of a ring or frame, and a lower intensity can be applied in the second region which is then located in the center.

This can be achieved, for example, by making the machining beam impinge on the end faces for example by means of a so-called "2-in-1" fiber which has a core fiber and a ring fiber, into which different laser power can be coupled. In this way, the power in the core fiber can be reduced so that the machining beam has a lower intensity in the center than in the edge region. If the power in the core fiber is equal to 0 and laser power is only coupled into the ring fiber, then no energy at all will be applied in the center of the end face of the hairpins and the intensity of the machining beam in the center would accordingly be equal to 0.

These above-mentioned impingements with different intensities of the machining beam in the plane of the end faces take into account in particular the fact that in the edge region of the machining beam, which also strikes the edge region of the cross section of the hairpin, heat diffusion takes place through the outer walls of the hairpins, which does not occur in the central region since the latter is enclosed by the edge region. Correspondingly, the inhomogeneous input of machining energy by the machining beam nevertheless achieves substantially homogeneous heating of the cross section of the hairpin.

What is common to the aforementioned methods is that the machining energy is introduced into the end faces of the copper hairpins to be joined to one another. Correspondingly, essentially one-dimensional heat conduction takes place, which spreads in the manner of a burning candle substantially in the direction in which the material for joining the hairpins to be joined to one another is intended to be melted. It is thus possible for the material of the copper hairpins, said material being correspondingly impinged upon by the machining beam, to be melted in a controlled manner such that good control of the method is possible.

This good control in particular also applies if the material, as in the present case of the copper hairpins, has a high thermal conductivity and correspondingly the geometry of the components to be joined to one another can lead to one-dimensional heat conduction, as is the case with a hairpin geometry.

The welding depth is thus also not limited by the available intensity of the machining beam, but rather by the surface tension of the liquid melt bead. Correspondingly, the melting can be continued, and thus the liquid volume of the melt bead can be accumulated, until the melt bead flows away. However, the welding process is preferably terminated before the melt bead flows away in this manner.

Accordingly, a very robust method is specified in which a welding result that is constant over the successively joined hairpin pairings is achieved on account of the high absorption of the machining beam in the material of the copper hairpins.

The high absorption ultimately has the effect that there are only minor fluctuations in the input energy, since fluctuations in the surface properties lead only to relatively minor fluctuations in the energy input into the material of the hairpin. This means that fluctuations in the surface properties also cannot lead to a major change in the welding method, such that a more constant welding result is correspondingly achieved. Furthermore, because the formation of the vapor capillary is avoided, almost no spatter occurs during the welding of the hairpins and the welding result has a lower tendency to form process pores.

Furthermore, due to the use of the wavelength range described above, the intensity of the machining beam can be set such that evaporation does not occur or occurs only to a very minor extent. This is possible on account of the high level of absorption of the machining beam in the copper material of the copper hairpins.

Hairpins with a substantially rectangular cross-sectional contour having a width and a depth are preferably provided, wherein preferably a width of 1 mm to 10 mm and a depth of 1 mm to 10 mm is provided. Small hairpins can preferably have a width and/or a depth of 0.5 mm to 1.5 mm, medium-sized hairpins can preferably have a width and/or depth of 1.5 mm to 6 mm and large hairpins can have a width and/or depth of 6 mm to 10 mm.

Hairpins with a coating for mechanical and/or chemical protection and/or for electrical insulation are preferably provided, wherein the coating is preferably provided in the form of a coating composed of PAI (polyamide-imide), PEEK (polyether ether ketone), PEI (polyesterimide) or PI (polyimide such as for example Kapton).

The object stated above is also achieved by a stator for an electric motor having the features as claimed.

Accordingly, a stator for an electric motor with a stator winding formed from joined-together copper hairpins is proposed. According to the invention, the hairpins are joined by the method described above.

The stator winding is thus joined substantially by heat conduction welding, such that greater homogeneity of the individual joining points with one another and reduced formation of process pores in the joining points can be achieved.

BRIEF DESCRIPTION OF THE FIGURES

Preferred further embodiments of the invention will be explained in more detail by the following description of the figures. In the figures.

DETAILED DESCRIPTION OF PREFERRED EXEMPLARY EMBODIMENTS

In the following text, preferred exemplary embodiments will be described with reference to the figures. Here, elements that are identical, similar or have the same effect are provided with identical reference designations in the various figures, and a repeated description of these elements is in some cases dispensed with in order to avoid redundancies.

Figure 1:
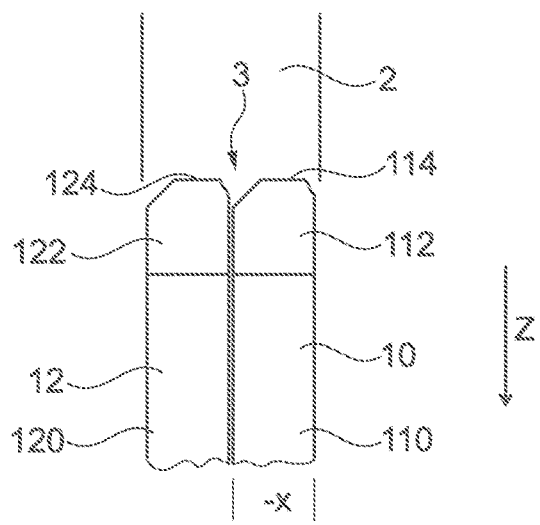
FIG. 1 shows a schematic side view of two copper hairpins to be joined to one another, which are impinged on by a machining beam.

FIG. 1 schematically shows the respective ends of two hairpins 10, 12 which are already in a joining position. For this purpose, in the embodiment shown, the two ends of the hairpins 10, 12 have already been shortened and placed against one another such that joining by means of laser beam welding is made possible.

In FIG. 1, end faces 114, 124 of the ends of the hairpins 10, 12 point upward toward a machining beam 2.

In order to be able to join the ends of the hairpins 10, 12 by means of laser welding, the ends to be joined of the hairpins 10, 12 correspondingly bear against one another at least in a jointly formed plane 3, wherein the gap between the two ends of the hairpins 10, 12 should be kept as small as possible and a gap is preferably not present. The contact area between the two ends of the hairpins 10, 12 that is present in the common plane 3 is thus as large as possible.

Furthermore, it is preferable for a lateral offset with respect to the common plane 3 of the two ends of the hairpins 10, 12 to be minimized or preferably to be avoided. Furthermore, a height offset with respect to the respective end faces 114, 124 of the two ends of the hairpins 10, 12 is preferably also kept very small or preferably avoided, and an angular position between the ends of the two hairpins 10, 12 is preferably also kept particularly small or preferably avoided.

In order to achieve the aforementioned preferred orientation in particular also of the end faces 114, 124 before the actual joining of the two ends of the hairpins 10, 12 and to be able to also maintain said orientation during the joining, use is for example made of mechanical clamps in order to gather together the ends of the hairpins 10, 12.

The hairpins 10, 12 each have a mechanically and chemically protective and electrically insulating coating 110, 120, which can be provided for example in the form of a plastics coating. In a prepared region 112, 122, which comprises the ends to be joined of the hairpins 10, 12, the respective coating is removed from the hairpins 10, 12 such that only the bare copper material without further coating remains in these prepared regions.

In this way, as a result of the provision of the prepared regions 112, 122 of the ends of the hairpins 10, 12, the bare copper material of the two hairpins 10, 12 also bears against one another in the jointly formed plane 3. The joining by laser beam welding is also intended to take place in this region, such that the material melted for the welding is then free of impurities.

The coating 110, 120 is removed from the ends of the hairpins 10, 12 in order to avoid impurities being introduced into the melt during the welding process, said impurities possibly leading, for example, to an indefinable strength of the re-solidified material and/or to defects in the microstructure of the re-solidified material and/or to fluctuations in the conductivity of the re-solidified material at the joining point. Furthermore, by removing the coating 110, 120, the formation of toxic vapors during laser beam welding is avoided.

The prepared regions 112, 122 are oriented relative to one another such that the joining of the two copper hairpins 10, 12 by laser beam welding is reliably made possible.

The cleaning or the removal of the coating 110, 120 from the hairpins 10, 12 in the prepared regions 112, 122 can be carried out, for example, by laser machining or by known mechanical or chemical cleaning operations, in order to prepare the hairpins 10, 12 for the actual joining.

The process of preparing, orienting, forming and gathering-together two ends of copper hairpins 10, 12 is known in principle and is not specified further here.

Figure 2:
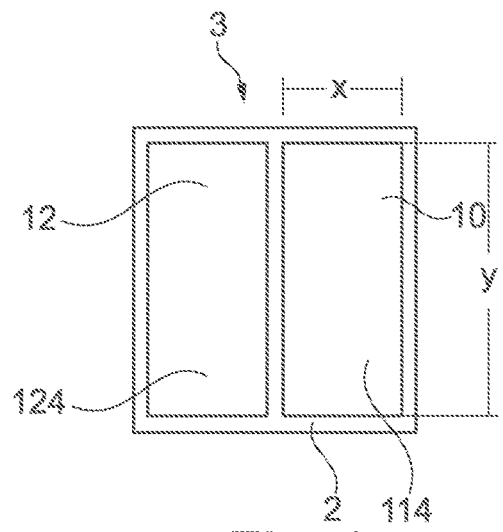
FIG. 2 shows a schematic plan view of the end faces of the two copper hairpins to be joined to one another of FIG. 1, and also of a machining beam.

FIG. 2 shows a plan view of two hairpins 10, 12 which have already been prepared, oriented relative to one another and gathered together and which are intended to be joined to one another.

As can readily be seen from the plan view, the hairpins 10, 12 each have a substantially rectangular cross-sectional contour having in each case a width X and a depth Y. This cross-sectional contour of the hairpins 10, 12 also corresponds to the contour of the end face 114, 124 of the hairpins 10, 12, which is then effectively impinged upon by the machining beam 3. In the exemplary embodiment shown, the common plane 3, in which the two ends of the hairpins 10, 12 bear against one another, is produced along the depth extent Y (that is to say perpendicular to the width X).

Typical dimensions of a hairpin 10, 12 are for example a width X of 1 mm to 10 mm and a depth of 1 mm to 10 mm. Small hairpins can preferably have a width and/or a depth of 0.5 mm to 1.5 mm, medium-sized hairpins can preferably have a width and/or depth of 1.5 mm to 6 mm and large hairpins can have a width and/or depth of 6 mm to 10 mm. The specific dimensioning of the copper hairpins 10, 12 is produced on the basis of the respective application.

The base material of a copper hairpin 10, 12 is for example copper, for example oxygen-free copper (ETP—electrolytic tough pitch) for electrical applications.

The coating 110, 120 of the hairpins can be present for example in the form of a coating composed of PAI (polyamide-imide), PEEK (polyether ether ketone), PEI (polyesterimide) or PI (polyimide such as for example Kapton), in order to mechanically and chemically protect the base material of the copper hairpins 10, 12 and to provide electrical insulation.

The ends of the hairpins 10, 12, which are provided for the construction of a stator winding of a stator for an electric motor, accordingly also have this rectangular or else square cross-sectional contour, which accordingly enables areal abutment of the ends to be joined of the hairpins 10, 12 in the common plane 3.

The joining of the copper hairpins 10, 12 can then be carried out by means of a machining beam 2, which is schematically indicated in FIGS. 1 and 2.

As can be seen for example in FIG. 2, the machining beam 2 is preferably formed such that it impinges on the total end face of the ends to be joined of the hairpins 10, 12. The total end face is formed from the end faces 114, 124 of the respective ends of the copper hairpins 10, 12, which are correspondingly directed upward in FIG. 1 and which are shown in plan view in FIG. 2.

In a preferred alternative, which is shown further below in relation to FIG. 3, the machining beam may also impinge only partially on the end faces 114, 124 of the hairpins 10, 12 to be joined to one another.

The machining beam 2 is a laser beam by means of which the two hairpins 10, 12 can be joined by laser beam welding.

The wavelength of the machining beam 2 used here is less than 1000 nm.

In the exemplary embodiment shown in FIGS. 1 and 2, the machining beam 2 is preferably a green machining beam 2, which is formed by a laser beam having a wavelength of 500 nm to 550 nm, particularly preferably having a wavelength of 510 nm to 520 nm. Or the machining beam 2 is a blue machining beam 2, which is formed by a laser beam having a wavelength of 425 nm to 475 nm, particularly preferably having a wavelength of 440 nm to 450 nm.

What is achieved by the selected wavelength range of the machining beam 2 is that the energy of the machining beam 2 is well absorbed by the hairpins 10, 12, and in particular by their base material in the form of the copper material. In this way, an efficient input of laser energy and thus of heat energy into the hairpins 10, 12 is possible, such that laser beam welding by means of heat conduction welding is made possible. Due to the increased absorption of the energy of the machining beam 2 in the copper material, the formation of a vapor capillary can be dispensed with.

Whether a welding process is a heat conduction process or a deep welding process is largely dependent on the energy density or the intensity of the machining beam 2 impinging on the copper hairpins 10, 12 to be joined to one another. Exceeding a so-called threshold intensity, from which the heat conduction process changes into a deep welding process, should ideally be avoided.

However, the use of high machining energies is also conceivable as long as the machining energy is distributed over a large area, for example in the case of hairpins which have an above-average-sized diameter or an above-average-sized end face 114, 124. Owing to the large machining area, the achieved energy density or intensity of the machining beam is then preferably to be adjusted again such that the threshold intensity, from which the heat conduction process changes into a deep welding process, is not exceeded.

If the machining beam 2 applies laser energy to substantially the total end face 114, 124 of the hairpins 10, 12 to be joined to one another, heat conduction takes place within the hairpins 10, 12 from this end face 114, 124 in the longitudinal direction, which is indicated by the longitudinal direction Z in FIG. 1. Correspondingly, heat conduction takes place in the hairpins 10, 12 in an essentially one-dimensional manner, namely along the longitudinal direction Z, which is also the heat conduction direction.

The machining beam 2 is preferably oriented such that, on the one hand, it impinges with the machining beam on the respective end faces 114, 124 of the hairpins 10, 12. At the same time, the machining beam 2 is preferably also oriented such that it extends substantially in the longitudinal direction Z of the hairpins 10, 12. Accordingly, a melt bead formed by the melted material remains in the region of influence of the machining beam 2 during laser beam welding of the hairpins 10, 12 even if the melt bead moves in the direction of heat propagation, i.e. longitudinal direction Z of the hairpins 10, 12.

The orientation of the cross section of the machining beam 2 is preferably also oriented according to the orientation of the end faces 114, 124 of the ends of the hairpins 10, 12 and in particular the dimensions and rotational orientation relative to the axis of the machining beam 2. The implementation of such a dimensioning and rotational orientation of the machining beam 2 is known in principle, such that it will not be discussed further here.

Figure 3:
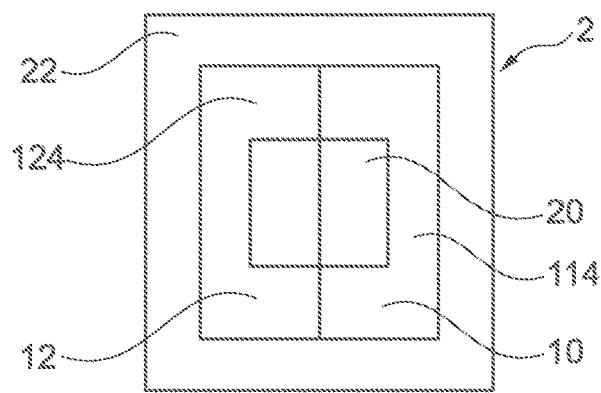
FIG. 3 shows a further schematic plan view of two copper hairpins to be joined to one another with a further machining beam which has two different intensity ranges.

An alternative refinement of the machining beam 2 is now shown in FIG. 3, the machining beam 2 being divided and applying a different intensity to the end face 114, 124 of the hairpins 10, 12 in a central region 20 than in its edge region 22, which surrounds the central region 20.

In other words, the machining beam 2 may for example not apply any intensity at all to the central region 20, such that the intensity of the machining beam 2 in the central region 20 is equal to 0. That edge region 22 of the end face 114, 124 on which the machining beam 2 impinges is correspondingly configured for example in the form of a frame or ring.

In a further preferred alternative, it is also possible for a machining beam 2 having a first intensity in a first region 22 and a second intensity in a second region 20 to impinge on the end faces 114, 124. In the first region 22 and in the second region 20, it is alternatively or additionally also possible for the end faces 114, 124 to be impinged upon with different wavelengths of the machining beam 2.

In other words, a higher intensity can be applied to the end faces 114, 124 for example in a first region 22, which is configured for example in the form of a ring or frame, and a lower intensity can be applied in the second region 20 which is then located in the central region.

This can be achieved, for example, by making the machining beam 2 impinge on the end faces 114, 124 for example by means of a so-called "2-in-1" fiber which has a core fiber and a ring fiber, into which different laser power can be coupled. In this way, the power in the core fiber can be reduced so that the machining beam has a lower intensity in the center than in the edge region. If the power in the core fiber is equal to 0 and laser power is only coupled into the ring fiber, then no energy at all will be applied in the center of the end face 114, 124 of the hairpins 10, 12 and the intensity of the machining beam 2 in the center would accordingly be equal to 0.

These above-mentioned impingements with different intensities of the machining beam 2 in the plane of the end faces 114, 124 take into account in particular the fact that in the edge region of the machining beam 2, which also strikes the edge region of the cross section of the hairpin 10, 12, heat diffusion takes place through the outer walls of the hairpins, which does not occur in the central region since the latter is enclosed by the edge region. Correspondingly, the inhomogeneous input of machining energy by the machining beam 2 nevertheless achieves substantially homogeneous heating of the cross section of the hairpin 10, 12.

Since the machining beam 2 strikes the end face 114, 124 of the hairpins 10, 12 and is also oriented in the longitudinal direction Z of the hairpins 10, 12, it is the case that one-dimensional heat conduction, and thus also an extension of the heat conduction in the direction of the welding depth, occurs in principle. This also results in the possibility of a virtually infinite welding depth in the hairpins 10, 12, which is theoretically limited only by the extent of the hairpins 10, 12 in the longitudinal direction Z.

In practice, however, the aim is to achieve a significantly more limited welding depth, which results in a melt bead that has no tendency to flow away, in order to avoid uncontrolled distribution of the melted material. In other words, the welding depth is limited by the surface tension of the melt, since it is undesirable for the melted material of the melt bead to flow away.

Furthermore, both a mechanically and electrically reliable connection of the two hairpins 10, 12 can be established in this way, in order to in this way achieve a mechanically and electrically reliable joining of the hairpins 10, 12 and to thus provide a reliable formation of a stator winding of a stator for an electric motor.

As far as applicable, all of the individual features illustrated in the exemplary embodiments can be combined with one another and/or exchanged without departing from the scope of the invention.

LIST OF REFERENCE SIGNS

10 Copper hairpin
12 Copper hairpin
110 Coating
112 Prepared region
114 End face
120 Coating
122 Prepared region
124 End face
2 Machining beam
20 Central region
22 Edge region
3 Common plane
X Width of the hairpin
Y Depth of the hairpin
Z Longitudinal direction of the hairpin

The invention claimed is:

1. A method for joining copper hairpins, the method comprising:
   providing at least two ends of the copper hairpins to be joined to one another, the copper hairpins having end sides with a given cross-sectional geometry; and
   joining the copper hairpins to be joined by laser beam welding with a machining beam having a wavelength of less than 1000 nm; and
   forming the machining beam to impinge on the cross-sectional geometry of the end side of the hairpins with at least two different intensities, and thereby causing the machining beam to impinge with a first intensity in a first region of the end side and with a second intensity in a second region of the end side.

2. The method according to claim 1, which comprises using a green machining beam or a blue machining beam.

3. The method according to claim 2, which comprises using a green laser beam having a wavelength of 500 nm to 550 nm or a blue laser beam having a wavelength of 425 nm to 475 nm.

4. The method according to claim 2, which comprises using a green laser beam having a wavelength of 510 nm to 520 nm or a blue laser beam having a wavelength of 440 nm to 450 nm.

5. The method according to claim 1, which comprises welding the copper hairpins to one another by way of heat conduction welding, and selecting an intensity of the machining beam to substantially avoid deep welding and/or a formation of a vapor capillary.

6. The method according to claim 1, which comprises directing the machining beam onto end faces of the ends of the hairpins to be joined and radiating the machining beam with a beam axis towards the hairpins in a longitudinal direction of the hairpins.

7. The method according to claim 1, which comprises forming the machining beam to take up a cross-sectional geometry of an end side of the hairpins, and impinging a cross section of the machining beam completely on an end face of the hairpins.

8. The method according to claim 1, which comprises configuring the machining beam with a different intensity in a center thereof than in an edge region thereof.

9. The method according to claim 8, which comprises delivering the machining beam via a core fiber and a ring fiber and coupling into the core and ring fibers mutually different intensities and/or different wavelengths.

10. The method according to claim 1, which comprises selecting an intensity of the machining beam to prevent evaporation of a material of the copper hairpins from occurring.

11. The method according to claim 1, which comprises selecting an intensity of the machining beam to substantially prevent evaporation of a material of the copper hairpins from occurring.

12. The method according to claim 1, which comprises providing the hairpins with a substantially rectangular cross-sectional contour having a width dimension and a depth dimension.

13. The method according to claim 12, wherein the width dimension is 1 mm to 10 mm and the depth dimension is 1 mm to 10 mm.

14. The method according to claim 12, wherein the width dimension is 0.5 mm to 1.5 mm and the depth dimension is 0.5 mm to 1.5 mm.

15. The method according to claim 12, wherein at least one of the width dimension or the depth dimension lies between 1.5 mm and 6 mm or between 6 mm and 10 mm.

16. The method according to claim 1, which comprises providing the hairpins with a coating for at least one of a mechanical protection, chemical protection, or electrical insulation.

17. The method according to claim 16, wherein the coating is composed of a polymer selected from the group consisting of polyamide-imide, polyether ether ketone, polyesterimide, and polyimide.

18. The method according to claim 16, wherein the coating is composed of Kapton®.

* * * * *